Figure 1:
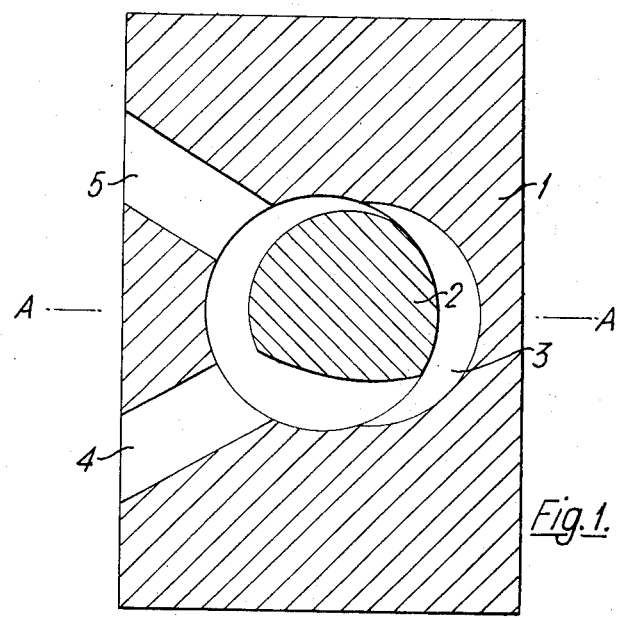

United States Patent
Wood

[11] 3,788,355
[45] Jan. 29, 1974

[54] VALVE

[75] Inventor: Derek John Wood, Harrogate, England

[73] Assignee: Imperial Chemical Industries Limited, London, England

[22] Filed: Sept. 24, 1971

[21] Appl. No.: 183,459

[30] Foreign Application Priority Data
Oct. 19, 1970 Great Britain................ 49,448/70

[52] U.S. Cl........ 137/625.11, 137/610, 137/625.16, 137/625.47
[51] Int. Cl............................................. F16k 11/00
[58] Field of Search . 137/625.11, 609, 610, 625.16, 137/628, 625.47, 630.2, 607

[56] References Cited
UNITED STATES PATENTS
| | | | |
|---|---|---|---|
| 3,519,021 | 7/1970 | Wiswell, Jr. | 137/625.47 |
| 3,167,067 | 1/1965 | Rand | 137/628 X |
| 3,307,579 | 3/1967 | Beddoes | 137/625.11 X |
| 2,700,985 | 2/1955 | Gleasman | 137/625.11 |
| 2,818,881 | 1/1958 | Bonner et al. | 137/625.11 |
| 2,830,564 | 4/1958 | Bryant | 137/625.11 |
| 2,797,707 | 7/1957 | Hursh | 137/625.11 |
| 3,543,796 | 12/1970 | Durant | 137/625.11 |
| 3,369,565 | 2/1968 | Haggard, Jr. | 137/625.11 |

FOREIGN PATENTS OR APPLICATIONS
895,749  5/1962  Great Britain................ 137/625.47

Primary Examiner—Samuel Scott
Assistant Examiner—Ira S. Lazarus
Attorney, Agent, or Firm—Cushman, Darby & Cushman

[57] ABSTRACT

A valve is provided having an inlet and a number of outlets any one of the outlets being closable while allowing flow through the others, there being no stagnant zones in the valve when liquid passes through all outlets.

8 Claims, 6 Drawing Figures

VALVE

The present invention relates to a valve controlling the supply of liquid from a single source to a plurality of streams.

According to the present invention we provide a valve comprising a body, containing a chamber, and a rotor within the chamber and coacting with the body, the chamber having an inlet for liquid and a plurality of outlets for liquid, the rotor bearing a surface which on relative rotation of the rotor with respect to the chamber progressively coacts with the surface of the chamber surrounding each of the outlets, thereby effecting a pressure tight joint preventing liquid passing from the chamber into one of the outlets while allowing liquid to pass from the chamber to the other outlet or all other outlets, the rotor also having at least one relative rotary position allowing liquid to enter the inlet and to pass from the chamber to all outlets, the rotor and the chamber each being so formed and so disposed with relation to each other that when in the relative rotary position, or at least one of the relative rotary positions, allowing liquid to pass from the chamber to all outlets, there exists a continuous flow of liquid throughout each part of the chamber lying between adjacent outlets whereby there is avoided the existence of stagnant zones within the valve.

By a continuous flow of liquid throughout each part of the chamber lying between adjacent outlets, I mean that throughout the volume delineated by the inner surface of the chamber between adjacent outlets and the corresponding surface of the rotor there is a continual movement of each part of the liquid towards an outlet, without there being recirculation within an isolated volume or an effectively stationary volume of liquid.

By a stagnant zone we mean a zone in which liquid resides for greater than a permissible time.

Our invention is of particular utility in connection with liquids of high viscosity, for which in practice turbulent flow is not attained and which are therefore particularly prone to the existence of stagnant zones.

Our invention is also of particular utility in connection with liquids which change their properties with time. An example of such is a liquid which is passed through such a valve at an elevated temperature, for example a polymer melting at an elevated temperature and in the liquid state and which progressively degrades at such a temperature, resulting, for example, in undesirable reduction in molecular weight or undesirable colour change. Such polymers, examples of which are polyesters, polyamides and polypropylene, when of fibre or film-forming molecular weight are also of high melt viscosity.

A permissible time is that which is less than at the temperature pertaining will result in degradation of the liquid to an extent resulting in alteration of a property of it to an extent which is unacceptable. Such effect is well known, for example, in the field of melt-spinning of organic polymers, in such case degradation at the elevated temperatures commonly used results in the production of dark coloured polymer melt, which may contaminate the general polymer melt with production of darker streaks, darker individual filaments or darker sections of filaments.

Two (or more) such valves may be coupled, for example they may have a common operating spindle. Thus, for example, when the liquid passing through each valve is a fibre-forming polymer in the molten state and a different polymer is fed through each valve in forming bicomponent fibres, the flow of each type of polymer may be interrupted or restarted at the same time.

The specified continuous flow of liquid throughout each passage between adjacent outlets, can be achieved according to the following general treatment.

Consider a valve assembly wherein:

$n$ = the number of outlets.

$v$ = the volumetric flow through each outlet, $R$ = the pressure drop per unit flow of liquid between adjacent outlets; the suffixes $1, 2, 3 \ldots m \ldots n$ are used to define successive outlets and the suffix I is used to define the inlet.

The requirement is that no stagnant zone is formed between any two adjacent outlets. This is achieved when the lqiuid flow through one of the outlets is a composite of liquid which has flowed in a clockwise direction round the rotor and liquid which has flowed in an anticlockwise direction round the rotor. Let this otulet be the $(m+1)$th. Further, let $\epsilon$ be the proportion of the flow through this outlet being supplied by the flow path which feeds the outlets which precede it in numerical order.

Thus the total pressure drop along the flow path feeding the outlets which precede the (m + 1)th in numerical order is given by:

$(m + \epsilon) v (R_{I\ to\ 1}) + (m + \epsilon - 1) v (R_{1\ to\ 2}) + (m + \epsilon - 2) v (R_{2\ to\ 3}) + + \ldots + \epsilon v(R_{m\ to\ m\ +\ 1})$.

Similarly, the total pressure drop along the other path between the inlet and the (m + 1)th exit is given by:

$(n - m - \epsilon) v (R_{I\ to\ n}) + (n - m - \epsilon - 1) v (R_{n\ to\ n\ -\ 1}) + (n - m - \epsilon -2) v (R_{n\ -\ 1\ to\ n\ -\ 2}) + \ldots + (1 - \epsilon) v (R_{m\ +\ 2\ to\ m\ +1})$.

The pressure drop along these two flow paths will, of course, be equal and the design of the chamber of the valve, the rotor and the setting of the rotor will be arranged in such a manner that the liquid flow from each path to the $(m + 1)$ the outlet is approximately equal, that is $\epsilon$ is approximately one-half. The further the value of $\epsilon$ moves away from one-half the greater will be the dwell time in one of the liquid flows.

In designing valves according to our invention a practical test of success in achieving freedom from stagnant zones may be made as follows. A highly viscous, black liquid, for example a polymer having dispersed in it very finely divided carbon black, is passed through the valve so as to fill the available spaces in the valve. Supply of black liquid is then ceased and the same liquid having dispersed in it finely divided titanium dioxide is passed through the valve. The time taken for black streaks in the issuing white liquid to disappear is a measure of the extent to which stagnant zones are present. The time taken should therefore be short.

Preferably the inner surface of the chamber and the surface of the rotor are so formed that there are present no reentrant surfaces, so that the production of stagnant zones is still further minimised.

In association with the valve rotor there may be externally visible means for indicating the rotational position of the rotor in relation to closure of each of the outlets and to the position, or at least one of the positions allowing liquid to pass from the chamber to all outlets. In association with the valve rotor there may also be mechanical means facilitating, or making obligatory, the precise setting of the rotor in the predetermined, desirable, alternative rotational positions. Examples of such mechanical means are a spring loaded ball co-operating with a depression and a cam and spring loaded follower.

In the foregoing discussion, it has been assumed that the liquid flow to each of the outlets is equal, but the same general principle can be applied to designs wherein the flows through the various outlets are not equal.

Figure 2:
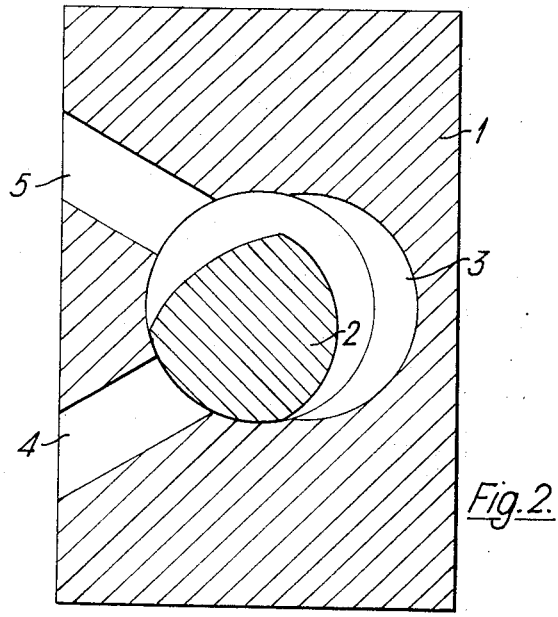
Figure 3:
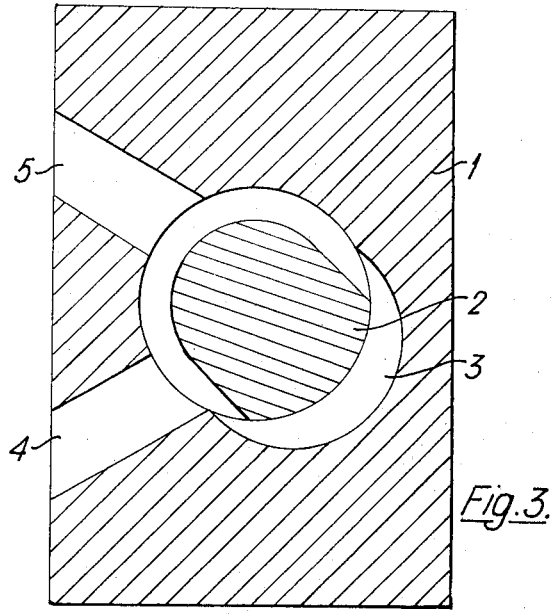
Figure 4:
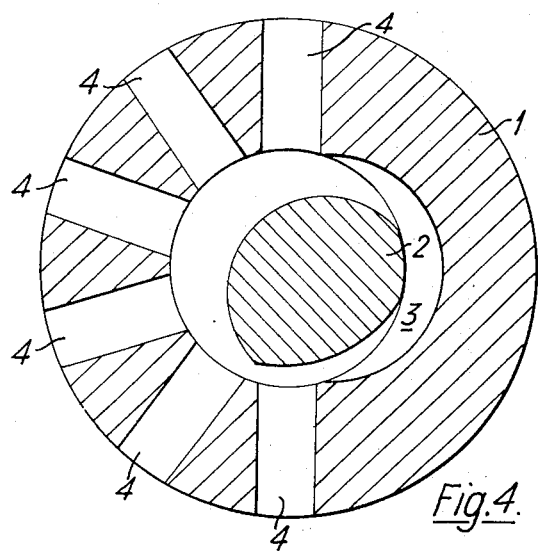
Figure 5:
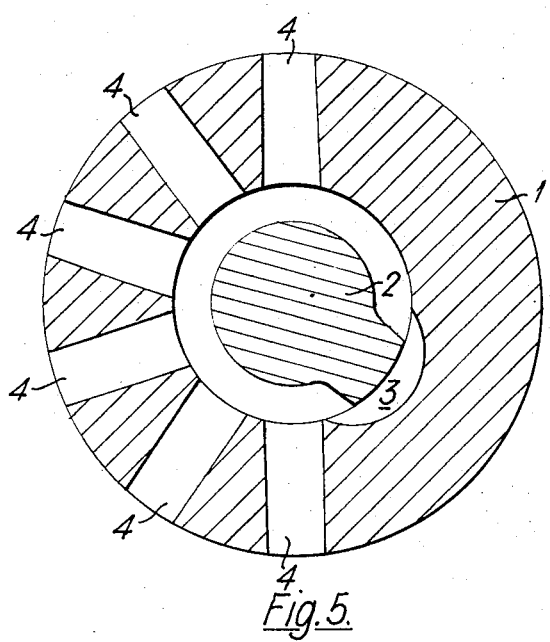

Specific embodiments of our invention will now be described by way of example, with reference to and as illustrated by the accompanying drawings in which:

FIG. 1 shows a valve according to our invention having two outlets and shown in the open position, FIG. 2 shows the valve of FIG. 1 in the position wherein one of the outlets is closed, FIG. 3 shows an alternative form of a valve according to our invention having two outlets and shown in the open position, FIG. 4 shows a valve according to our invention having six outlets and shown in the open position, FIG. 5 shows an alternative form of a valve according to our invention having six outlets and shown in the open position.

Figure 6:
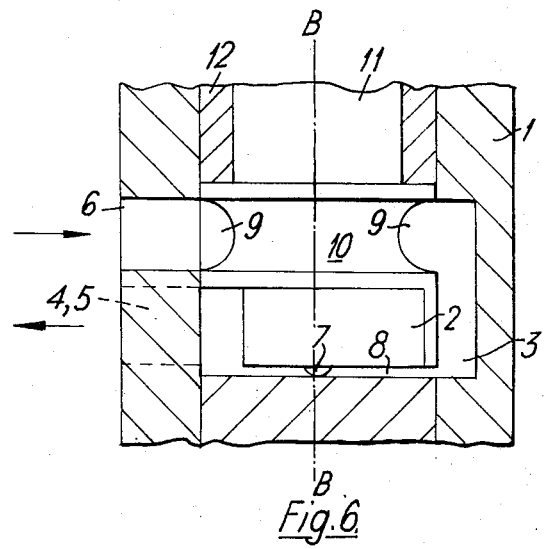

FIG. 6 shows a section through A — A of the valve of FIG. 1.

In all of the Figures, like parts are similarly designated.

Referring to FIGS. 1, 2, 3, 4, 5 and 6, the valve comprises a body (1) a rotor (2) an inlet (3) and outlets (4) and (5); all outlets are labelled (4) in FIGS. 4 and 5. A protuberance (7) is provided as part of the rotor in order to prevent the lower part of the body of the rotor (see FIG. 6) approaching closely to the body of the valve, thus continual purging of the liquid through the space (8) prevents a stagnant zone at that position. The part (2), the toroidal part (10) and the cylindrical part (11) are in fixed relationship to each other, but rotatable about the axis B — B. A screwed collar (12) serves to retain the rotor (2) in its normal relationship with the body of the valve (1).

It will be noted that there are broadly two approaches to the problem of manufacture of a valve according to our invention. In the first, as illustrated in FIGS. 1, 2 and 4, the inlet and the outlets have bilateral symmetry in respect of their relative disposition. In this case, considering a cross-section of the rotor at right angles to its axis of rotation and passing through the surface which coacts with the surface of the valve chamber, this cross-section has no bilateral symmetry, thus proceeding clockwise from the inlet to the first outlet, the passage traversed by the liquid, and which is formed by the inner surface of the valve chamber and the surface of the rotor, is inevitably different in form from the passage traversed by the liquid from the inlet to the first outlet when proceeding in an anticlockwise direction. The same situation pertains for the second outlet proceeding clockwise and the second outlet proceeding anticlockwise, in the case wherein there are more than two outlets. This situation ensures disparity of flow between the clockwise direction and the anticlockwise direction, thus favouring the elimination of stagnant zones.

In the second approach, as illustrated in FIGS. 3 and 5, there is no bilateral symmetry between the disposition of the inlet and the outlets; in this case the cross-section through the rotor at right angles to its axis of rotation and passing through the surface which coacts with the surface of the valve chamber may have bilateral symmetry, since there is a difference in path length from the inlet to the first outlet in the clockwise and in the anticlockwise direction, which also ensures disparity of flow between the clockwise and anticlockwise direction. In either approach the detail design of the flow passageways should be in accordance with the considerations set out hereinbefore.

What we claim is:

1. A valve comprising a body containing a chamber, and a rotor within the chamber and coacting with the surface of the chamber, the chamber having an inlet for liquid and a plurality of outlets for liquid, the rotor bearing a surface which on relative rotation of the rotor with respect to the chamber progressively coacts with the surface of the chamber surrounding each of the outlets, thereby effecting a pressure tight joint preventing liquid passing from the chamber into one of the outlets while allowing liquid to pass from the chamber to the other outlet or all other outlets, the rotor also having at least one relative rotary position allowing liquid to enter the inlet and to pass from the chamber to all outlets, the rotor and the chamber each being so formed and so disposed with relation to each other that when in the one relative rotary position liquid is allowed to pass from the chamber to all outlets and there exists a continuous flow of liquid throughout each part of the chamber lying between adjacent outlets whereby there is avoided the existence of stagnant zones within the valve.

2. A valve according to claim 1 wherein when the rotor is in the one relative rotary position the liquid flow through one of the outlets is a composite of liquid which has flowed in a clockwise direction round the rotor and liquid which has flowed in an anticlockwise direction round the rotor.

3. A valve according to claim 1 wherein there is bilateral symmetry in respect of the disposition of the outlets in relation to the inlet, and the cross-section of the rotor at right angles to its axis of rotation and passing through the surface which coacts with the surface of the valve chamber has no bilateral symmetry.

4. A valve according to claim 1 wherein there is no bilateral symmetry in respect of the disposition of the outlets in relation to the inlet.

5. A valve according to claim 4, wherein a cross-section of the rotor at right angles to its axis of rotation has bilateral symmetry.

6. A valve according to claim 1, in which the rotor has attached at one end thereof a protuberance that co-operates with the body of the valve for further preventing the stagnation of liquid about the one end of the rotor.

7. A valve comprising: a body containing a chamber; a rotor rotatably mounted within the chamber, the rotor having a transverse cross-sectional area less than that of the chamber so as to form a fluid space between the rotor and the surface of the chamber, said chamber having an inlet and at least three outlets communicating with said fluid space, said cross-sectional area of said rotor exhibiting a peripheral surface portion which on relative rotation of the rotor progressively coacts with the surface of the chamber surrounding each of the outlets to close only the respective outlet while permitting fluid flow from said fluid space to all the other outlets, said rotor also having a rotary position in which fluid can flow through said inlet and from said fluid space to all of said outlets.

8. A valve as in claim 7 wherein said inlet and said outlets are disposed in a common plane and generally radially with respect to the axis of rotation of the rotor and wherein said peripheral surface portion of the rotor is of smaller area than said inlet so that when said surface portion is adjacent said inlet fluid can flow clockwise and counterclockwise around the rotor.

* * * * *